United States Patent
Zahiri et al.

(10) Patent No.: US 12,509,776 B2
(45) Date of Patent: Dec. 30, 2025

(54) PROCESS FOR FORMING WROUGHT STRUCTURES USING COLD SPRAY

(71) Applicant: Commonwealth Scientific and Industrial Research Organisation, Acton (AU)

(72) Inventors: Saden Heshmatollah Zahiri, Clayton South (AU); Stefan Gulizia, Clayton South (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 743 days.

(21) Appl. No.: 17/532,658

(22) Filed: Nov. 22, 2021

(65) Prior Publication Data
US 2022/0152705 A1     May 19, 2022

Related U.S. Application Data

(62) Division of application No. 16/624,741, filed as application No. PCT/AU2018/050608 on Jun. 20, 2018, now Pat. No. 12,084,776.

(30) Foreign Application Priority Data

Jun. 20, 2017     (AU) .................................. 2017902355

(51) Int. Cl.
*B22F 10/66*     (2021.01)
*B21B 27/06*     (2006.01)
(Continued)

(52) U.S. Cl.
CPC .............. *C23C 24/04* (2013.01); *B21B 27/06* (2013.01); *B21B 45/004* (2013.01); *B22F 3/12* (2013.01);
(Continued)

(58) Field of Classification Search
CPC ....... B21B 27/00; B21B 27/06; B21B 45/004; B22F 10/66; B22F 10/25; B22F 12/63; B22F 3/12
See application file for complete search history.

(56) References Cited

U.S. PATENT DOCUMENTS

| 3,944,782 A * | 3/1976 | Metcalfe | ............... | B21B 45/004 |
| | | | | 219/83 |
| 4,420,441 A | 12/1983 | Singer | | |

(Continued)

FOREIGN PATENT DOCUMENTS

| CN | 106734470 A | 5/2017 |
| EP | 3 137 242 A1 | 3/2017 |

(Continued)

OTHER PUBLICATIONS

International Searching Report and Written Opinion of the International Searching Authority for International Patent Application No. PCT/AU2018/050608 mailed Aug. 20, 2018, 10 pages.

(Continued)

*Primary Examiner* — Teresa M Ekiert
(74) *Attorney, Agent, or Firm* — Merchant & Gould P.C.

(57) ABSTRACT

A process and apparatus of producing a product having a wrought structure. The process comprises the step of: applying heat and a compressive load simultaneously to an application area of a cold spray deposition preform to transform the comprising consolidated particle structure into a wrought structure, the compressive load being applied laterally to the application area. The application of compressive load and heat to the application area raises the temperature of the material of the preform in the application area to between the recrystallisation temperature and the melting point of the material.

12 Claims, 11 Drawing Sheets

(51) Int. Cl.
  *B21B 45/00*   (2006.01)
  *B22F 3/12*    (2006.01)
  *B22F 10/25*   (2021.01)
  *B22F 12/63*   (2021.01)
  *B33Y 10/00*   (2015.01)
  *B33Y 30/00*   (2015.01)
  *B33Y 40/20*   (2020.01)
  *C23C 24/04*   (2006.01)
  *B22F 10/38*   (2021.01)
  *B22F 10/64*   (2021.01)
  *B22F 10/73*   (2021.01)

(52) U.S. Cl.
  CPC .............. *B22F 10/25* (2021.01); *B22F 10/66* (2021.01); *B22F 12/63* (2021.01); *B33Y 10/00* (2014.12); *B33Y 30/00* (2014.12); *B33Y 40/20* (2020.01); *B22F 10/38* (2021.01); *B22F 10/64* (2021.01); *B22F 10/73* (2021.01)

(56) References Cited

U.S. PATENT DOCUMENTS

| | | | | |
|---|---|---|---|---|
| 5,042,281 | A | * | 8/1991 | Metcalfe ............... B21B 45/004 72/200 |
| 6,905,728 | B1 | | 6/2005 | Hu et al. |
| 7,028,522 | B2 | * | 4/2006 | Kim ..................... B21B 45/004 72/200 |
| 8,486,496 | B2 | | 7/2013 | Ko et al. |
| 2005/0084701 | A1 | | 4/2005 | Slattery et al. |
| 2005/0153069 | A1 | | 7/2005 | Tapphorn et al. |
| 2006/0045785 | A1 | | 3/2006 | Hu et al. |
| 2009/0249603 | A1 | | 10/2009 | Vargas |
| 2013/0047394 | A1 | | 2/2013 | Cretegny et al. |
| 2013/0299347 | A1 | | 11/2013 | Rozak et al. |
| 2015/0283642 | A1 | | 10/2015 | Forsdike et al. |
| 2016/0030632 | A1 | | 2/2016 | Schleicher et al. |
| 2016/0122557 | A1 | | 5/2016 | Magdefrau et al. |
| 2017/0157671 | A1 | | 6/2017 | King et al. |

FOREIGN PATENT DOCUMENTS

| | | |
|---|---|---|
| JP | 2016-517472 A | 6/2016 |
| WO | 2009/109016 A1 | 9/2009 |
| WO | 2011/017752 A1 | 2/2011 |
| WO | 2014/149996 A2 | 9/2014 |
| WO | 2015/157816 A1 | 10/2015 |

OTHER PUBLICATIONS

International-Type Search Report for Australian Patent Application No. 2017902355 mailed Aug. 16, 2017, 8 pages.

Extended European Search Report for corresponding European Patent Application No. 18820346.7 mailed Apr. 22, 2020, 9 pages.

Search Report and Written Opinion for corresponding Singapore Patent Application No. 11201912219P mailed Sep. 16, 2020, 9 pages.

Chinese Office Action for Chinese Patent Application No. 201880054398.3 dated Jul. 6, 2021, 13 pages.

Blose, R. et al., "New opportunities to use cold spray process for applying additive features to titanium alloys", Metal Powder Report, 61.9: 30-37 (Oct. 2006).

Delville, R. et al., "Microstructure changes during non-conventional heat treatment of thin Ni—Ti wires by pulsed electric current studied by transmission electron microscopy", Acta Materialia, 58: 4503-4515 (2010).

Fukumoto, S. et al., "Small-scale resistance spot welding of austenitic stainless steels", Materials Science and Engineering A, 492: 243-249 (2008).

Kahraman, N., "The influence of welding parameters on the joing strength of resistance spot-welded titanium sheets", Materials and Design, 28: 420-427 (2007).

Tammas-Williams, S. et al., "The Effectiveness of Hot Isostatic Pressing for Closing Porosity in Titanium Parts Manufactured by Selective Electron Beam Melting", Metallurgical and Materials Transactions A, 47A: 1939-1946 (May 2016).

Villafuerte, J., "Considering Cold Spray for Additive Manufacturing", Advanced Materials & Processes, 172(5): 50-52 (2014).

Zhou, Y. et al., "Densification and grain growth in pulse electric current sintering of alumina", Journal of the European Ceramic Society, 24: 3465-3470 (2004).

Smith, M., "Comparing cold spray with thermal spray coating technologies", Chapter 3, The Cold Spray Materials Deposition Process: Fundamentals and Applications, Woodhead Publishing Seriers in Metals and Surface Engineering, 43-61 (2007).

Smith, M., "Introduction to Cold Spray", Chapter 1, High Pressure Cold Spray—Principles and Applications, ASM International, 1-11 (2016).

Japanese Office Action for Japanese Patent Application No. 2019-570457 mailed Feb. 28, 2022, 5 pages.

Smith, M.F. et al., "Introduction to Cold Spray", Sandia National Laboratories, High Pressure Cold Spray—Principles and Applications, 1-11 (2016).

\* cited by examiner

60 μm

200 μm

PROCESS FOR FORMING WROUGHT STRUCTURES USING COLD SPRAY

CROSS REFERENCE

The present application is a divisional of U.S. patent application Ser. No. 16/624,741 filed on 19 Dec. 2019, which is a National Stage Application of PCT/AU2018/050608 filed 20 Jun. 2018, which claims priority from Australian provisional patent application No. 2017902355 filed on 20 Jun. 2017, the contents of which should be understood to be incorporated into this specification by this reference. To the extent appropriate, a claim of priority is made to each of the above disclosed applications.

TECHNICAL FIELD

The present invention generally relates to a process of producing wrought structures from cold spray deposition of powders and associated apparatus. The invention is particularly applicable for producing Titanium and Titanium alloy wrought structures and it will be convenient to hereinafter disclose the invention in relation to that exemplary application. However, it should be appreciated that the invention should not be limited to the application and could be applicable to cold spray deposition of a number of metals, metal/metallic alloys, metal matrix composites and the like.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Wrought materials are materials that have been "worked" from commonly cast materials, or even from additive manufacturing processed materials, so as to improve properties such as ductility. Wrought materials are normally free of the internal and external defects such as shrink and porosity that are common problems in castings and are inherently stronger at high temperatures in the cast forms over wrought grades. The microstructure plays a large role in the material properties and the surface topography also plays a role in its utility and longevity since a smooth surface of a wrought metal or alloy helps avoid focal points for accelerated corrosion, for example by molten salts or carbon deposits.

Common industrial practices to make wrought materials include Hot Isostatic Pressing or Pressure (HIP) which is a well-established process to improve the mechanical properties and workability of a wide variety of materials such as titanium, steel, aluminium and superalloys. HIP processes involve sealing a formed article in a pressure chamber and applying an isostatic pressure and an elevated temperature within that pressure chamber for a selected period, for example 950° C. at 100 MPa for 4 h. The chamber is generally pressurised by heating an inert gas within the pressure chamber. HIPing therefore provides a multi-direction pressure that is applied over the entire outer surface of the treated article. Using this process, voids within a casting can be reduced or eliminated and encapsulated powders can be consolidated to create fully dense materials. Furthermore, entrapped gas apparent as small pressurised bubbles, generated as a result of gas entrapped during casting or an additive manufacture process can be removed. Thus using HIPing processes, the microstructure can be converted into a wrought structure.

Many metals, including titanium and its alloys can now also made method using additive manufacturing, such as cold spray technology. In cold spray processes, small particles in the solid state are accelerated to high velocities (normally above 500 m/s) in a supersonic gas jet and deposited on a substrate material. The kinetic energy of the particles is utilised to achieve bonding through plastic deformation upon impact with the substrate. The absence of oxidation enables cold spray technology to be used for near net shape manufacturing of shaped titanium products from a powder.

Solid spray deposit components can be formed through progressive deposition of layers in a desired spray pattern, see for example the Applicant's international patent publication WO2015157816. However, the production of low porosity solid shapes formed using conventional cold spray methods can have formation and structural issues due to the heating requirements of the accelerating gas required to achieve high velocities and requisite thermal softening of the particles which facilitate the production of a low porosity deposit. For example, the production of a cold sprayed titanium alloy having low porosity typically requires preheating of the cold spray gas in the range 700 to 1100° C. This inevitably results in considerable heat transfer to the cold spray deposit every time the cold spray gas jet moves across the cold spray deposit to spray cold spray particles thereon. Heating produces thermal stresses which can cause cracking in large deposits, or separation of the deposit from the substrate, even while cold spray is still in progress. Oxidation may even occur if the surface temperature is high enough.

Given the success of using HIP to form a wrought structure from cast materials, efforts have been made to adopt this technique to additive manufacturing techniques. For example, Blose, R. E., et al. describes in a report, "New opportunities to use cold spray process for applying additive features to titanium alloys." Metal Powder Report 61.9 (2006): 30-37, the application of heat treatment and HIPing to cold sprayed Ti-6Al-4V consolidated particle coatings. Blose found that heat treatment alone had no effect in reducing the porosity. However, metallography analysis showed that the density of all the coatings was close to 100 percent (regardless of the initial porosity) after HIPing. The microstructure of the HIPed samples was also found to be the same as it is obtained in cast and wrought deformed and recrystallized material. A further example is taught in U.S. Pat. No. 6,905,728 which teaches a method in which cold gas dynamic spray process particles are cold sprayed onto a turbine blades or vanes and that part is then vacuum sintered; subject to a HIP process after the vacuum sintering step; and heat treated after performing the HIPing step.

However, there are still some shortcomings with these methods. Tammas-Williams in Metallurgical and Materials Transactions A, Vol 47/5, 1939-1946 observed that large tunnel defects can appear after HIPing. The inventors have themselves also observed that entrapped gases can coalesce and form large gas pockets in the core of the material when using HIP, see for example FIG. 1(C). Furthermore, HIPing is an energy intensive, expensive, and time consuming batch process. It uses high pressure and temperatures which can be hazardous and require specialized equipment.

It would therefore be desirable to provide a new and/or alternate method of producing a wrought structure from cold spray derived material.

SUMMARY OF THE INVENTION

The present invention provides a method and an apparatus for additive manufacturing of wrought structures derived cold spray consolidated particle deposition.

A first aspect of the present invention provides a process of producing a product having a wrought structure, the process comprising:

applying heat and a compressive load simultaneously to an application area of a cold spray deposition preform having a consolidated particle structure to transform the consolidated particle structure into a wrought structure, wherein the compressive load is applied laterally to the application area, and wherein the application of the compressive load and heat to the application area raises the temperature of the material of the preform in the application area to between the recrystallisation temperature and the melting point of the material.

The process of the present invention enables the formation of a wrought structured product of metals metal alloys or metal composites through the simultaneous application of heat and load/pressure to a cold spray deposited preform after that cold spray preform is formed. The selected and simultaneous application of heat and compressive load, applied laterally, enables rapid recrystallisation of a porous consolidated particle cold spray structure into a wrought structure.

The simultaneous application of the lateral loading and heat to the application area of the preform causes structural transformation (recrystallisation) of the consolidated cold sprayed particle structure to the wrought structure therein. Whilst not wishing to be limited by any one theory, it is thought that the applied heat provides sufficient thermal energy to raise the local temperature of the preform material in the application area to above the recrystallisation temperature of the material but below the melting point of the material. The grains of the crystal structure of the cold spray deposited material are therefore replaced by a new set of grains that nucleate and grow in the crystal structure of that material. The compressive lateral load acts on two fronts, it contributes to elimination of porosity and at the same time initiates work hardening required for dynamic and static recrystallisation. In this sense, the applied compressive lateral load is able to compress the structure at that temperature removing any pores or voids in the structure/microstructure. A denser wrought structure/wrought microstructure results. As can be appreciated, the size of the newly formed grains/crystals defines the final mechanical properties of the material.

It should be appreciated that the load is applied laterally to the application area and not multi-directionally, as has been applied in prior art HIP processes, for example as described in the background of the invention. The present invention therefore uses a compressive process that provides lateral compression to the application zone, for example using a compressive stamp or roller(s). In comparison, HIPing is an energy intensive, expensive, time consuming and cumbersome batch process. HIPing is restricted to processing structures that are only certain geometries, or certain sizes as result of the need for containing the material in a vessel and applying multi-directional pressure. The present invention aims to avoid these disadvantages, and preferably provides a continuous process. It is to be understood that lateral application of the compressive load indicates that the direction the compressive load is applied to the application area is lateral to the plane of the application area.

In most instances, that compression load direction (load application direction) would be substantially perpendicular to the planar face of the application area. For curved surfaces, that compression load direction (load application direction) would be substantially perpendicular to the tangential plane of the application area or point.

It is to be understood that a cold spray deposition preform is a preform formed using cold spray deposition. This type of preform has a consolidated particle structure, typically comprising a consolidated cold spray splat structure. Such a cold sprayed consolidated particle structure is formed from the deformation of particles impacting onto the substrate creating 'lentil' like features from the consolidated or agglomerated particles that accumulate on the top of each other to build up the preform into the desired shape and configuration. Generally, a cold spray splat structure provides high strength with limited ductility.

The preform can be provided in any desired form. However, the present invention is advantageously configured to process elongate bodies. In some embodiments, the preform is an elongate body such as (but not limited to) a strip, sheet, wire, rod or bar. The present invention therefore allows the treatment of elongated and long wires and tubes and the like to transform the microstructure of those preforms into a wrought structure.

It should also be appreciated that a wrought structure or wrought microstructure is a structure that contains limited if any cast dendritic elements. Preferably, the microstructure has an equiaxed crystalline grain structure.

In the present invention, the material with wrought structure (formed as a recrystallised structure) is fabricated without melting the material, i.e. via a melt-less path. In this sense, the cold sprayed consolidated particle structure is formed from solid particles. That deposited preform is rapidly recrystallised into a wrought structure below the melting point of the material. No state transformation occurs during the cold-spray process or compressive loading, making the process a solid-state process. The material is therefore is a solid state below the melting point of the material from raw material to finished wrought structured product. For some processes the final wrought structures can be produced directly from the powder. The present invention therefore provides a new and alternative approach to manufacturing milling products such as strips, bars, tubes, sheet and wire and also a large range of industrial products. The process therefore has a significantly lower carbon foot print compared to traditional melt-forming metallurgy processes, is safer and more efficient to operate than current methods.

Oxidation, nitriding, decarburizing and any decomposition in general are avoided in this process. The use of a melt-less process also allows for oxygen sensitive materials such as titanium and tantalum to be produced in wrought form rapidly and at significantly lower cost. For example, high strength, high ductility Ti wrought structure can be produced from Ti sponge crushed as powder without costly melting process that occurs under controlled atmosphere. Similar advantages are applicable to materials that are sensitive to phase transformation and solidification process.

The present invention also overcomes limitations of other additive manufacturing approaches with inherent melting processes. For example, the preform product of the present invention advantageously retains a substantially uniform microstructure throughout, without macrosegregation and other melt-related defects found in ingots because the constituting powder particles are not melted in the cold spray process.

The heat can be applied to the application area using a number of suitable techniques. In some embodiments, the heat is applied using conductive, inductive, resistive or thermal heating methods. However, it is preferred that the heating technique is a rapid heating technique. In embodiments, this rapid heating is achieved through heat being applied to the application area by at least one of: current, induction heating or laser heating. Each of these heating methods enable the application area to be rapidly heated to rapidly raise the local temperature of the preform material in the application area to above the recrystallisation temperature of the material but below the melting point of the material. Rapid heating entails the local temperature increasing at a rapid rate, typically heating at greater than 100° C./s, preferably greater than 200° C./s, more preferably greater than 500° C./s. It should be appreciated that "rapid" means that high local temperatures in the application area are reached within seconds as compared to hours using alternative techniques like in HIPing (which can take 1 to 2 hours to get to >1000° C.). The use of a rapid heating technique assists in avoiding oxidation of the material during that process. Moreover, rapid heating coupled with the simultaneous application of compressive load enable the wrought structure/microstructure of the preform to be formed rapidly in a solid state process. The preform can therefore be quickly converted to a wrought structure compared to prior processes, for example HIPing, facilitating scale up of the process and if desired a continuous process. In exemplary examples heat is applied to the application area using an electrical current based means. That current can be applied as an alternating current or direct current. Where a direct current is used, that current preferably comprises a pulsed direct current. The current can be applied in different duty cycles. For example the duty cycle for AC or DC power can be 10% to 100%. Similarly, the current can have different pulse frequencies. For example, pulse frequencies for AC or DC power can be 0 Hz to 500 Hz.

Where heat is applied to the application area as a current that application then heats the material of the application area through resistive heating of the material. The optimal current applied to the preform is therefore material dependent. Similarly, the optimal load applied to the application area depends on the mechanical and physical properties of the formed preform. Those properties are dependent on the constituent material and the properties (porosity and density) of the cold spray deposited material forming the preform as well as the thickness of the preform. The applied current and compressive load can therefore fall in a wide range of values depending on the material and properties of the formed preform. In embodiments, the current density of the applied current is from 500 to 2000 A/mm$^2$, preferably from 800 to 1500 A/mm$^2$, more preferably 1000 to 1100 A/mm$^2$. The voltage associated with the applied current is preferably 2 to 3 volts. In embodiments, the applied compressive load is from 10 to 100 kg/m$^2$, preferably from 20 to 60 kg/m$^2$.

It should be appreciated that load and heat applied to the sample for recrystallisation, rotation speed of the rollers and deposition speed of the cold spray material are influential parameters in the process of the present invention. Furthermore, the feed rate through the compressive load application system, preferably rollers, is typically synchronised with the rate at which the preform is made via the cold spray system.

The application of compressive load and heat to the application area raises the local temperature of the material of the preform in the application area to between the recrystallisation temperature and the melting point of the material. The local temperature that the material should be heated to is, of course, material specific, depending on the recrystallisation temperature and the melting point of the material. In embodiments, that local temperature is between 35% and 85% of the melting point of the material, preferably between 40 and 60% of the melting point of the material, and yet more preferably between 45 and 55% of the melting point of the material. In some embodiments, that local temperature is about 50% of the melting point of the material. Again, that local temperature should be between the recrystallisation temperature and the melting point of the material. For example, the local temperature range for Ti (1600° C. melting temperature) and its alloys is around 500 to 800° C., for Ta which has a melting temperature of 3017° C., typical local temperatures may be around 1500° C., for Al, with a melting temperature of 660° C., typical local temperatures may be up to 570° C.

The speed that the deposited material passes through the rollers is also important as it relates to the speed that material deposits for continuous manufacture of the wrought structure. In embodiments, the feed rate of the preform from the deposition step to the application of load and current step is 1 to 10 mm/s, preferably 1 to 5 mm/s, and more preferably about 2 mm/s. In embodiments, the deposition speed of the cold spray material is 1 to 10 mm/s, preferably 1 to 5 mm/s, and more preferably about 2 mm/s. It should be appreciated that cold spray speed is preferably synchronised with feeding speed of the processing system for a certain height of material. Cold spray can produce significantly higher deposition rates ~15 kg/hr or 4 g/s, and therefore deposition can be higher if required. In this embodiment, this continuous coupling of the deposition followed by immediate application of a lateral compressive load and heat as the preform moves through the processing system is one of the advantages of this invention as it allows very rapid continuous processing of material obviates the need for a two-step process (found in current manufacturing processes) consisting of firstly cold spray deposition step followed by HIPing.

The compressive lateral load and heat can be simultaneously applied to the preform using a number of different apparatuses and arrangements. In embodiments, the compressive load is applied laterally using at least one roller configured to compressively engage the preform. Whilst a single roller could be used in conjunction with an engagement surface, it is preferred that at least two rollers are used, between which the preform is fed and compressed. At least one roller of this arrangement is preferably configured to apply heat, preferably in the form of current to the preform. The roller or rollers are configured to pass electrical current through the preform to generate 'heat' while applying load to transform splat structure to wrought structure. To achieve this, at least a portion of the rollers may comprise a conductive material.

It should be appreciated that the roller can be formed from any suitable material that allows the selected pressure and heat to be applied to a cold sprayed preform fed into engagement with the roller. Preferably, the material of the roller is selected to achieve high conductivity and wear resistance. Suitable materials include copper and copper alloys, steel, aluminium and aluminium alloys, Inconel, Tungsten, or the like.

In some embodiments, at least one roller includes a cooling system or arrangement. This enables control of the heat input to the material avoiding run away reactions and melting. That cooling system can comprise any suitable cooling system, such as refrigeration, water cooling, convective cooling, conductive cooling or the like.

The cold spray deposition preform is preferably formed in a formation step prior to the step of applying heat and a compressive load simultaneously to an application area of that preform. In embodiments, that step comprises:

forming a preform having a consolidated particle structure using cold spray deposition to additively build the structure in a desired configuration.

In some embodiments, the present invention therefore provides a process of producing a product having a wrought structure, the process comprising:

forming a preform having a consolidated particle structure using cold spray deposition to additively build the structure in a desired configuration; and applying heat and a compressive load simultaneously to an application area of the preform to transform the comprising consolidated particle structure into a wrought structure, wherein the compressive load is applied laterally to the application area, and wherein the application of the compressive load and heat to the application area raises the temperature of the material of the preform in the application area to between the recrystallisation temperature and the melting point of the material.

The preform can be cold sprayed on any suitable surface prior to being subjected to heating and compressive lateral load. The preform is typically formed on or about a feed axis along which the preform moves in the process. That feed axis can be aligned with a surface, for example a deposition surface on which the preform is formed by depositing material onto said deposition surface. In some embodiments, the deposition surface may form a surface of one of the rollers. In such embodiments, the preform is formed on the surface of at least one of the rollers prior to being compressed by said rollers.

The preform is formed using cold spray deposition. In embodiments, the forming step comprises:

using a cold spray applicator to deposit cold sprayed material on a deposition surface to form a product deposition surface on or about a feed axis;

successively depositing material onto a respective top product deposition surface using cold spray deposition to form successive deposition layers of the material; and moving at least one of: the cold spray applicator, or the preform, relative to the other in an axial direction along the feed axis, thereby forming a preform of a selected length.

It should also be understood that the term "top product deposition surface" is the deposition surface of the outer or newest deposition layer of the preform product, axially closest to the cold spray applicator. It should also be appreciated that once the cold spray applicator or the preform is moved the cold spray applicator is again used to deposit cold sprayed material on a deposition surface to form a product deposition surface on or about a feed axis and then successively depositing material onto a respective top product deposition surface to successively form the preform. Those steps are repeated until a desired length is obtained, or in the case of a continuous process, for a desired length of time until the equipment is shut down or the like.

The preform is preferably formed as a continuous element, typically in the form of an elongate body.

The present invention produces a preform product on or about a deposition axis. A preform formed from the process of the present invention can therefore comprise (but should not be limited to) at least one of a strip, bar, wire, sheet, slab, disc, rod, pole, staff, wand, cylinder, column, mast, shaft, dowel or the like. In embodiments, the preform is formed as a strip, sheet, wire, rod or bar. In some embodiments, the preform comprises a bar, which is understood to have a length greater than its width/diameter, for example at least twice its width/diameter. Large width or diameters preforms may be produced by the invention, limited only by the size of apparatus available. In other embodiments, the preform is hollow or includes one or more voids. In preferred embodiments the process is used to produce wires and rods.

Similarly, the present invention preferably produces a product on or about a deposition axis. A product formed from the process of the present invention can therefore comprise (but should not be limited to) at least one of a strip, bar, wire, sheet, slab, disc, rod, pole, staff, wand, cylinder, column, mast, shaft, dowel or the like. In embodiments, the product is formed as a strip, sheet, wire, rod or bar. In some embodiments, the product comprises a wire, rod or strip. Where the product is a wire, that wire may have a diameter of <10 mm, preferably <5 mm, more preferably <4 mm.

The process of the present invention enables the direct conversion of titanium powder into a wrought structure metallic body. With the advent of cheap titanium powders the process of the present invention may therefore provide an economically attractive option for producing primary mill products such as wires, bars or rods.

In some embodiments, the preform and/or product has a constant diameter along the length of the preform/ product. In other embodiments, the preform and/or product is formed with variable or non-constant diameter along the length of the preform. Preforms and products with a non-constant diameter include cone shapes, cone section, shapes with a step or taper (large diameter to smaller diameter) or the like. In one embodiment, the diameter changes in a constant manner throughout or along the length of the preform and/or product.

The process of the present invention preferably comprises a continuous manufacturing process. The inventors consider that 'Continuous additive manufacturing of wrought materials' is a new capability introduced by the present invention that may provide a cost effective manufacturing option for many industries. To assist in continuous manufacturing, the heat and compressive lateral load is preferably applied to the application area of the preform immediately after the formation of the application area of the preform by cold spray deposition. In embodiments, where the preform is elongate, the heat and the compressive lateral load is applied to the section of the preform soon after, preferably immediately after that section is formed by cold spray deposition. Where a discrete preform is formed, the heat and compressive lateral load is preferably applied to the preform immediately after the formation of the preform by cold spray deposition.

However, it should be appreciated that in other embodiments the process could be performed in at least two separate steps, wherein in a first step the preform is formed using a cold spraying deposition process (as described above) and then subsequently in a second step, heat and compressive lateral load is applied to the preform. In these embodiments, the preform can be formed on any suitable substrate and can be subsequently transferred to the second step using any suitable means. In one embodiment, the preform is formed on a material having a different thermal expansion coefficient (for example a Ti preform is formed on a steel substrate) and that thermal expansion difference is utilized using either heating or cooling techniques to separate the formed preform from the substrate. In the second step, heat and compressive lateral load can be applied to the preform to transform the cold spray microstructure to a wrought microstructure. The compressive lateral load and heat can be applied to the formed preform using a variety of methods as previously discussed.

The cold spray deposition preform may comprise any suitable material, preferably any suitable metal or alloy thereof. It should be appreciated that the cold spray deposition preform may comprise at least one of Al, Cu, Zn, Ni, Ti, Ta, Mg, Sc, Fe, steel and alloys thereof. In some embodiments, the cold spray deposition preform may comprise metal matrix composites such as a mixture of metal with ceramics like carbides (for high wear resistant applications) and superconductors. In some embodiments, the material comprises at least one of Ti, Cu, Al, Fe, Sc, Ni, Mg, Ta or an alloy thereof. An example of a metal alloy of interest is alloy Ti-6Al-4V. This material is preferably produced as a preform using the process of the present invention.

In some embodiments, the cold spray deposition preform is formed from a cold spray deposited material comprising a mixture of at least two different powders. In some embodiments, the material comprises a ceramic or glass. In other embodiments, preforms composed of a composite of at least two different metals, or of a mixture of at least one metal and at least one ceramic could be made. For example a blend of two or more different powders, or composite particles (particles consisting of more than one material) could be used as feedstock. The process enables the creation of new wrought materials that could be only sourced from this invention through mixing different powder materials to achieve unique physical and mechanical properties such as application in superconductors and semiconductors.

In some embodiments, the composition of the cold spray deposition preform may be varied along the length of the preform. This may provide flexibility in terms of product characteristics. For example, a metallic preform such as a bar or rod that has different weld characteristics at opposing axial ends may be produced by varying the composition as between the different ends. Alternatively, if a variation in the preform properties (for example, coefficient of thermal expansion) is desired along the length of the preform, then the preform composition may be varied accordingly. Thus, the preform may comprise discrete lengths of different materials or the composition of the preform may be varied gradually along the length of the preform or the preform may comprise a combination of these arrangements.

If a preform is to be manufactured from multiple materials, then the compatibility of the different materials must be considered. Should two or more of the proposed materials be incompatible in some way (for example coherence/bonding), it may be necessary to separate the incompatible materials by one or more regions of mutually compatible material(s). Alternatively, the preform could be manufactured such that there is a gradual change in composition from one material to the next to ease any incompatibility problems between the materials used.

Any suitable particle/powder can be used with process of the present invention. The powder/particles used, and properties thereof will typically be selected to meet the desired properties, composition and/or economics for a particular preform product. Typically the size of the particles applied by cold spraying is from 5 to 45 microns with an average particle size of 15 to 30 microns. However, it should be appreciated that the particle size may vary depending on the source and specification of the powder used. Similarly, larger particles could also be used in some applications, for example particle sizes up to around 150 microns. A person skilled in the art will be able to determine the optimum particle size or particle size distribution to use based on the morphology of the powder and characteristics of the preform that is to be formed. Particles suitable for use in the present invention are commercially available.

It should be appreciated that the average size of the particles that are cold sprayed is likely to influence the density of the resultant layer deposition of material, and thus the density of the preform that is formed. Preferably the deposition is of uniform density. In some embodiments, the preform includes pores which are generally on the same scale as the sprayed particles. The pores are preferably of uniform concentration throughout the preform.

A second aspect of the present invention provides a wrought structure preform formed from a process according to the first aspect of the present invention.

A third aspect of the present invention provides an apparatus for producing a product having a wrought structure, comprising:
   a compressive load applicator configured to simultaneously apply heat and a compressive load to an application area of a cold spray deposition preform, the compressive load being applied laterally to the application area,
   wherein, in use the application of compressive load and heat to the application area raises the temperature of the material of the preform in the application area to between the recrystallisation temperature and the melting point of the material.

The third aspect of the present invention can also provide an apparatus for producing a product having a wrought structure, comprising:
   a compressive load applicator configured to simultaneously apply heat and a compressive load to an application area of a cold spray deposition preform to raise the temperature of the material of the preform in the application area to between the recrystallisation temperature and the melting point of the material, wherein the compressive load is applied laterally to the application area.

Heat can be applied to the application area using a number of suitable techniques. However, it is preferred that the heating technique is a rapid heating technique, a previously discussed in relation to the first aspect of the invention. In embodiments, this rapid heating is achieved through heat being applied to the application area by at least one of: current, induction heating or laser heating. In exemplary examples heat is applied to the application area using an electrical current based means. That current can be applied as an alternating current or direct current. Where a direct current is used, that current preferably comprises a pulsed direct current. The current can be applied in different duty cycles. For example the duty cycle for AC or DC power can be 10% to 100%. Similarly, the current can have different pulse frequencies. For example, pulse frequencies for AC or DC power can be 0 Hz to 500 Hz.

The optimal load applied depends on the mechanical and physical properties of the formed preform. In embodiments, the applied compressive load is from 10 to 100 $kg/m^2$, preferably from 20 to 60 $kg/m^2$.

Where the heat is applied as a current to the application area, the optimal current applied to the preform is material dependent. The applied current and compressive load can therefore fall in a wide range of values depending on the material and properties of the formed preform. In embodiments, the current density of the applied current is from 500 to 2000 $A/mm^2$, preferably from 800 to 1500 $A/mm^2$, more preferably 1000 to 1100 A/mm². The voltage associated with the applied current is preferably 2 to 3 volts.

As discussed above in relation to the first aspect of the present invention, the compressive lateral load and heat can be simultaneously applied to the preform using a number of different apparatus and arrangements. In embodiments, the compressive lateral load and heat is applied using at least one roller configured to compressively engage the preform. Whilst a single roller could be used in conjunction with an engagement surface, it is preferred that at least two rollers are used, between which the preform is fed and compressed. At least one roller of this arrangement is preferably configured to apply heat, preferably in the form of electrical current to the preform. The roller or rollers are configured to pass electrical current through the preform to generate 'heat' while applying load to transform splat structure to wrought structure. To achieve this, at least a portion of the rollers may comprise a conductive material.

It should be appreciated that the roller can be formed from any suitable material that allows the selected pressure and current to be applied to a cold sprayed preform fed into engagement with the roller. Preferably, the material of the roller is selected to achieve high conductivity and wear resistance. Suitable materials include Cu and Cu alloys, stainless steel, Al and Al alloys, Ni and Ni alloys like Inconel, Tungsten (W), Mg, Sc or the like.

In some embodiments, at least one roller includes a cooling system or arrangement. This enables control of the heat input to the material avoiding run away reactions and melting. That cooling system can comprise any suitable cooling system, such as refrigeration, water cooling, convective cooling, conductive cooling or the like.

The apparatus preferably further includes a cold spray deposition apparatus for forming the cold spray deposition preform on a deposition surface. The cold spray deposition preform can therefore be formed immediately prior to use of the compressive load applicator. In embodiments, the apparatus for producing a product having a wrought structure can comprising:
 a cold spray deposition apparatus for forming a preform on a deposition surface having a consolidated particle structure; and
 a compressive load applicator configured to simultaneously apply heat and a compressive load to an application area of the preform formed using the cold spray deposition apparatus to raise the temperature of the material of the preform in the application area to between the recrystallisation temperature and the melting point of the material, wherein the compressive load is applied laterally to the application area.

Again, preform is preferably formed on or about a feed axis along which the preform moves in the process. The preform could be formed on a deposition surface aligned along the feed axis. In some embodiments, that deposition surface comprises a surface of at least one of the rollers. In such embodiments, the preform is formed on the surface of at least one of the rollers prior to being compressed by said rollers.

The cold spray apparatus used in the present invention is likely to be of conventional form and such equipment is commercially available or individually built. In general terms, the basis of the equipment used for cold spraying is described and illustrated in U.S. Pat. No. 5,302,414 the contents of which should be understood to be incorporated into this specification by this reference. A number of commercially available cold spray equipment is available. It should be appreciated that the present invention is not limited to one or a certain type of cold spray system or equipment, and can be implemented using a wide variety of cold spray systems and equipment.

Cold spray equipment typically include a cold spray applicator in the form of a cold spray gun having a nozzle. The nozzle typically includes an exit opening through which deposit material is sprayed, the nozzle directing the sprayed deposit material in a desired direction. In use, the nozzle is preferably aligned substantially to or parallel to the axis of preform rotation during movement.

The operating parameters for the cold spraying process may be manipulated in order to achieve a preform that has desirable characteristics (density, surface finish etc.). Thus, parameters such as temperature, pressure, stand-off (the distance between the cold spraying nozzle and the starter substrate surface to be coated), powder feed rate and relative movement of the starter substrate and the cold spraying nozzle, may be adjusted as necessary. Generally, the smaller the particle size and distribution, the denser the layer formed on the surface of the starter substrate. It may be appropriate to adapt the cold spraying equipment used in order to allow for higher pressures and higher temperatures to be used in order to achieve higher particle velocity and more dense microstructures, or to allow for pre-heating the particles.

The deposition pattern and related movement of the cold spray applicator can also influence the morphology of the deposited layers of material. The deposition pattern and related movement of the spray applicator is therefore also preferably controlled. In some embodiments, the controlled movement comprises a linear cyclical motion between at least two points.

A fourth aspect of the present invention provides a method according to the first aspect of the present invention formed using an apparatus according to the third aspect of the present invention.

It should be appreciated that this invention has application in a number of fields including:
 Alternate process for forming products formed with a wrought structure for example mill products such as rods, billets, wires, plates, strips, nut, bolts, sheets or the like.
 Cold spray, thermal spray, welding, fabrication of rollers, car manufacturing, marine industry, mining, cable and wire manufacturing, biomedical applications, aerospace.
 Electronics and superconductivity through rapid creation of novel microstructure with certain electronic properties through melt less deposition combined with in-situ thermo-electrical thermo-mechanical processing of mixed powders.
 Rapid repair and refurbishment of parts caused by corrosion and wear.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
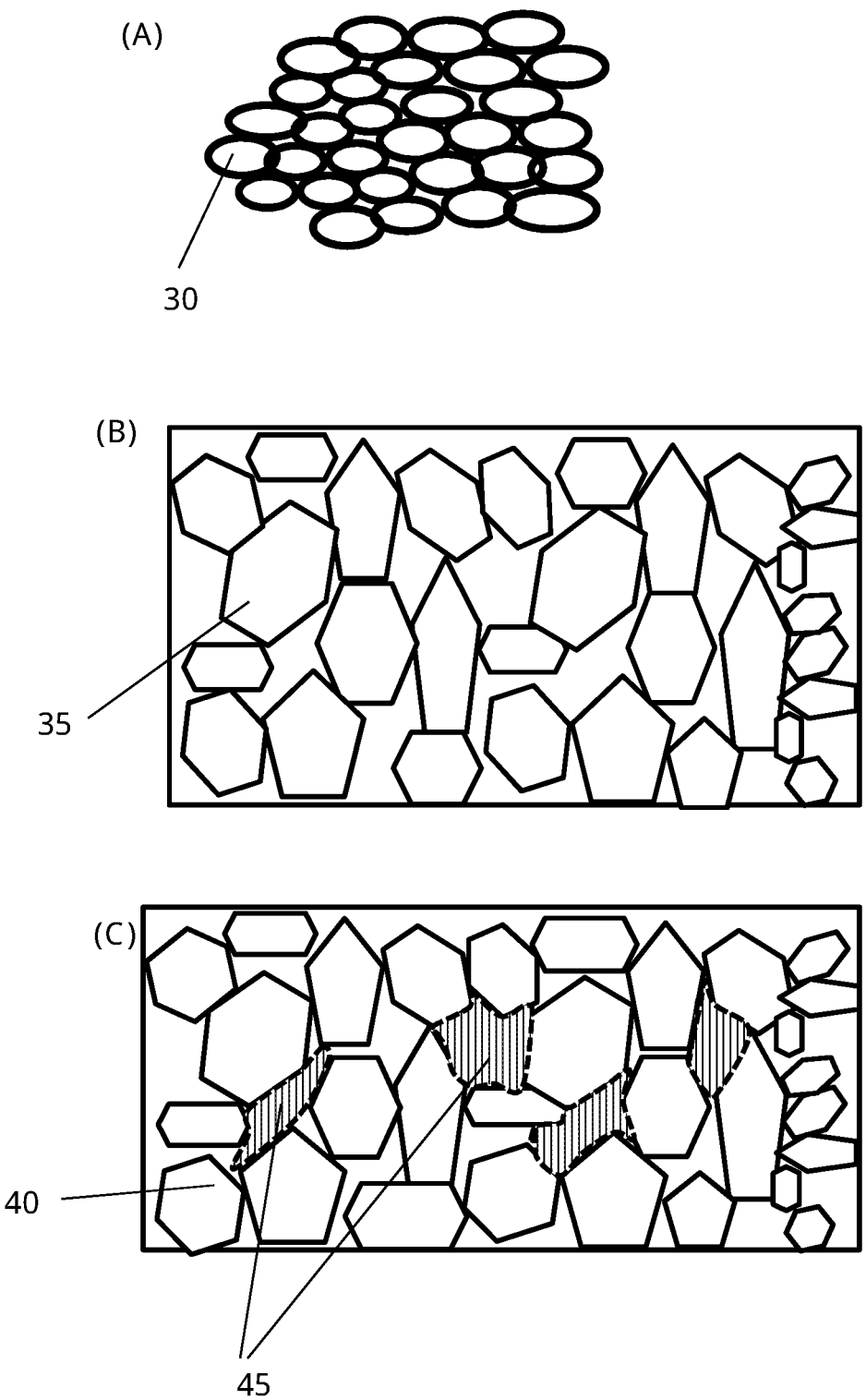
FIG. 1 provides schematic diagrams showing (A) consolidated particles (splats) of a cold sprayed material preform; (B) consolidated particles of a cold sprayed material preform that have undergone heat and compression according to the present invention to form a wrought material; and (C) consolidated particles of a cold sprayed material preform that have undergone HIP processing to form a wrought material.

The present invention provides a process of forming a preform such as a disk, bar, rod, cone or the like of material using cold spray technology. In this invention, the product has a wrought structure (known as a 'recrystallised' structure) and is fabricated through a melt-less path. In this sense, the raw solid powder material is a deposited cold sprayed consolidated particle structure, which is then rapidly recrystallised into the wrought structure. This solid powder transformation process does not involve a melting step. In embodiments, the material is able to be formed into the final wrought structure material by a continuous process starting from the solid powder feed material.

Cold spraying is a known process that has been used for applying coatings to surfaces. In general terms, the process involves feeding (metallic and/or non-metallic) particles into a high pressure gas flow stream which is then passed through a converging/diverging nozzle that causes the gas stream to be accelerated to supersonic velocities, or feeding particles into a supersonic gas stream after the nozzle throat. The particles are then directed to a surface to be deposited. The process is carried out at relatively low temperatures, below the melting point of the substrate and the particles to be deposited, with a coating being formed as a result of particle impingement on the substrate surface. The process takes place at relatively low temperature thereby allowing thermodynamic, thermal and/or chemical effects, on the surface being coated and the particles making up the coating, to be reduced or avoided. This means that the original structure and properties of the particles can be preserved without phase transformations or the like that might otherwise be associated with high temperature coating processes such as plasma, HVOF, arc, gas-flame spraying or other thermal spraying processes. The underlying principles, apparatus and methodology of cold spraying are described, for example, in U.S. Pat. No. 5,302,414 the contents of which should be understood to be incorporated into this specification by this reference.

In the present invention, cold spray technology is used to additively build up a consolidated particle preform structure on or about a feed axis which is subsequently processed using the simultaneous application of heat and lateral load/pressure to form a wrought structure along the feed axis.

It should be appreciated that the preform can comprises cold spray deposited material selected from at least one of Aluminium (Al), Copper (Cu), Zinc (Zn), Nickel (Ni), Titanium (Ti), Tantalum (Ta), steel, Magnesium (Mg), Scandium (Sc), Iron (Fe) and alloys thereof. In some embodiments, the cold spray deposited material may comprise metal matrix composites such as mixture of metal with ceramics like carbides (for high wear resistant applications) and superconductors. However, the present invention is particularly applicable to Ti, Cu, steel, and Al and their alloys.

To achieve continuous deposition of particles, the cold spray apparatus 110 and 100A (FIGS. 3 and 3A) preferably includes at least two powder feeders (not shown) allowing the powder feeders to be switched during operation when one feeder runs out of powder.

Figure 2A:
FIG. 2(A) provides a SEM micrograph showing the etched microstructure of cold spray that is formed from accumulation of cold sprayed consolidated particle Ti splats on aluminium substrate.

The consolidated particle preform structure is formed from deformation of the cold sprayed particles 112 impacting onto the substrate (in the illustrated embodiment lower roller 120—FIG. 3) creating 'lentil' like features from the consolidated particles that accumulate on the top of each other to build up the preform into the desired shape and configuration as shown in FIG. 2(A). FIG. 2(A) illustrates the etched microstructure of cold spray that is formed from accumulation of Ti splats on aluminium substrate. One lentil shaped splat 50 is highlighted in that microstructure. Other metals such as Cu, stainless steel, etc. have similar cold spray microstructure. Generally, a cold spray splat structure provides high strength with low ductility and can include voids between splats in the structure, the size and extent of these depending to some degree on the gases used, making the structure porous to an extent, see for example the cold spray microstructures shown in FIGS. 6, 8 and 12 which show voids.

Figure 2B:
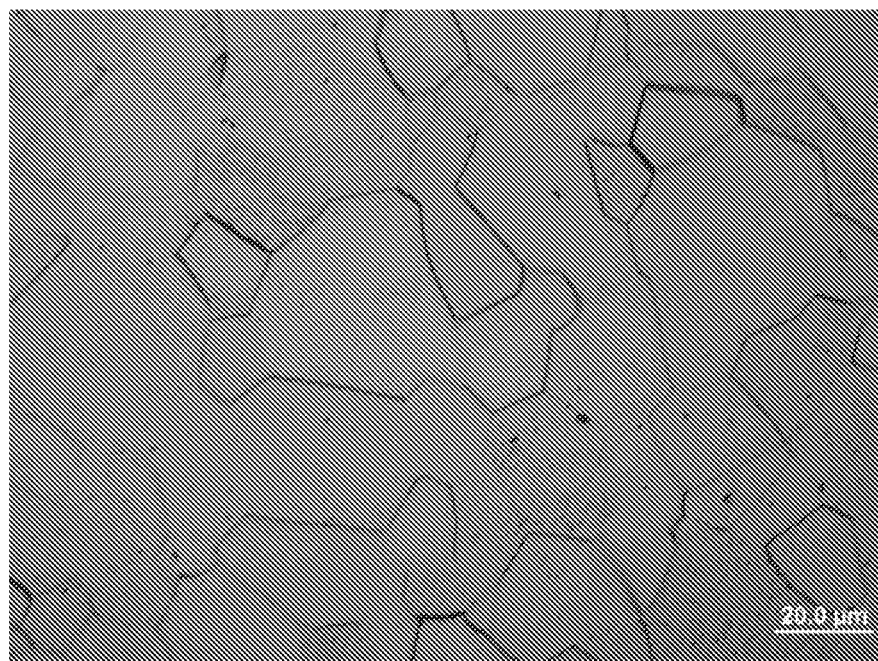
FIG. 2(B) depicts a SEM micrograph showing a commercially available wrought (Commercially Pure—"CP") Ti microstructure that is etched. Other metals with wrought microstructure such as Cu, stainless steel, Al, etc. achieve similar equiaxed crystalline grain structure.

Following deposition, an application area of the additively built up preform (for example a titanium strip) is subjected to a combination of compressive load and heat (which causes heating of the application area) to transform cold spray splat structure (FIG. 2(A)) to a dense wrought structure (FIG. 2(B)). As shown in FIG. 2(B), a wrought structure of this material has an equiaxed crystalline grain structure. Wrought structures of Al, Cu, Zn, Ni, Ta, Mg, Sc, Fe, steel, or their alloys would show similar equiaxed crystal structures. Wrought structured materials have superior mechanical properties such as high ductility that allows for manufacture of a large range of industrial products such as wires, cables, rods, billets, sheets, etc.

The compressive load can be applied to the preform using a variety of apparatus configurations. In some embodiments, the compressive load is applied using a press having a compression element. However, it is advantageous for the process to comprise a continuous process where the cold spray formed preform is continuously fed into, through or under a compressive load bearing apparatus to immediately transform the deposited material preform structure into a wrought structure.

It should be appreciated that in the apparatus the compressive load is applied laterally to the application area and not multi-directionally or universally over the entire surface area, as has been applied in Hot Isostatic Pressing (HIPing) processes. HIPing involves sealing a formed article in a pressure chamber and applying pressure and temperature for a selected to eliminate porosity period. HIPing therefore applies a pressure to the material from all directions. Application of pressure (load) from all directions to cold spray structures has significant limitation for porosity elimination due to interconnected porosity allowing almost equivalent pressure build up within cold spray material through the pressurising medium counter acting the applied pressure to the surface of the material. This compromises porosity elimination in cold spray structures using HIP. Pressurising, heating up and cooling down of the HIP chamber is a time consuming, energy intensive and costly process.

The present invention applies load laterally to the cold spray structure allowing for complete and rapid elimination of the porosity as demonstrated in the examples.

A schematic comparison of the various microstructures produced from the present invention and by HIP is provided in FIG. 1. As shown in that Figure, consolidated particles of a cold sprayed material (splat shaped particles 30) form a structure having significant porosity (FIG. 1(A)). The present invention forms a wrought material having an equiaxed grain 35 structure having minimal to no porosity or defects (FIG. 1(B)). In comparison a HIPed wrought material also has an equiaxed grain 40 structure but can still include defects and voids from entrapped gases that can coalesce and form large gas pockets in the core of the material (as described in the background), as shown by voids 45 in the structure of FIG. 1(C).

The applied heat can be applied to the application area using a number of suitable techniques. In embodiments, heat is applied to the application area by at least one of: current, induction heating or laser heating. As previously noted, each of these heating methods enable the application area to be rapidly heated to raise the local temperature of the preform material in the application area to above the recrystallisation temperature of the material but below the melting point of the material and thus avoid oxidation during that process. The use of a rapid heating technique assists in avoiding oxidation of the material during that process, as it significantly reduces the time oxidation and oxygen ingress may occur during recrystallisation. The preform can therefore be rapidly converted to a wrought structure compared to prior processes, for example HIPing.

In exemplary examples heat is applied to the application area using an electrical current based means. That current can be applied as an alternating current or direct current. Where a direct current is used, that current preferably comprises a pulsed direct current. The current can be applied in different duty cycles. For example the duty cycle for AC or DC power can be 10% to 100%. Similarly, the current can have different pulse frequencies. For example, pulse frequencies for AC or DC power can be 0 Hz to 500 Hz.

The application of compressive load and heat to the application area raises the local temperature of the material of the preform in the application area to between the recrystallisation temperature and the melting point of the material. The temperature of the material is of course material specific, depending on the recrystallisation temperature and the melting point of the material. In embodiments, that temperature is between 35% and 85% of the melting point of the material, preferably between 40 and 60% of the melting point of the material, and yet more preferably between 45 and 55% of the melting point of the material. In some embodiments, the temperature is about 50% of the melting point of the material.

For example, the temperature range for Ti (1600° C. melting temperature) and its alloys is around 500 to 800° C. Without wishing to be limited to any one theory, the inventors noted that at these temperatures Ti is softened under the applied lateral load. However, it should be appreciated that the interaction between heat (applied current) and load to transform the material adds complexity to the nature of the structural transformation. This enables the load and temperature to be varied (e.g. load can be increased and temperature decreased) to tune the material properties to achieve higher strength by reducing the size of crystals formed during the in-situ recrystallisation process.

Figure 3:
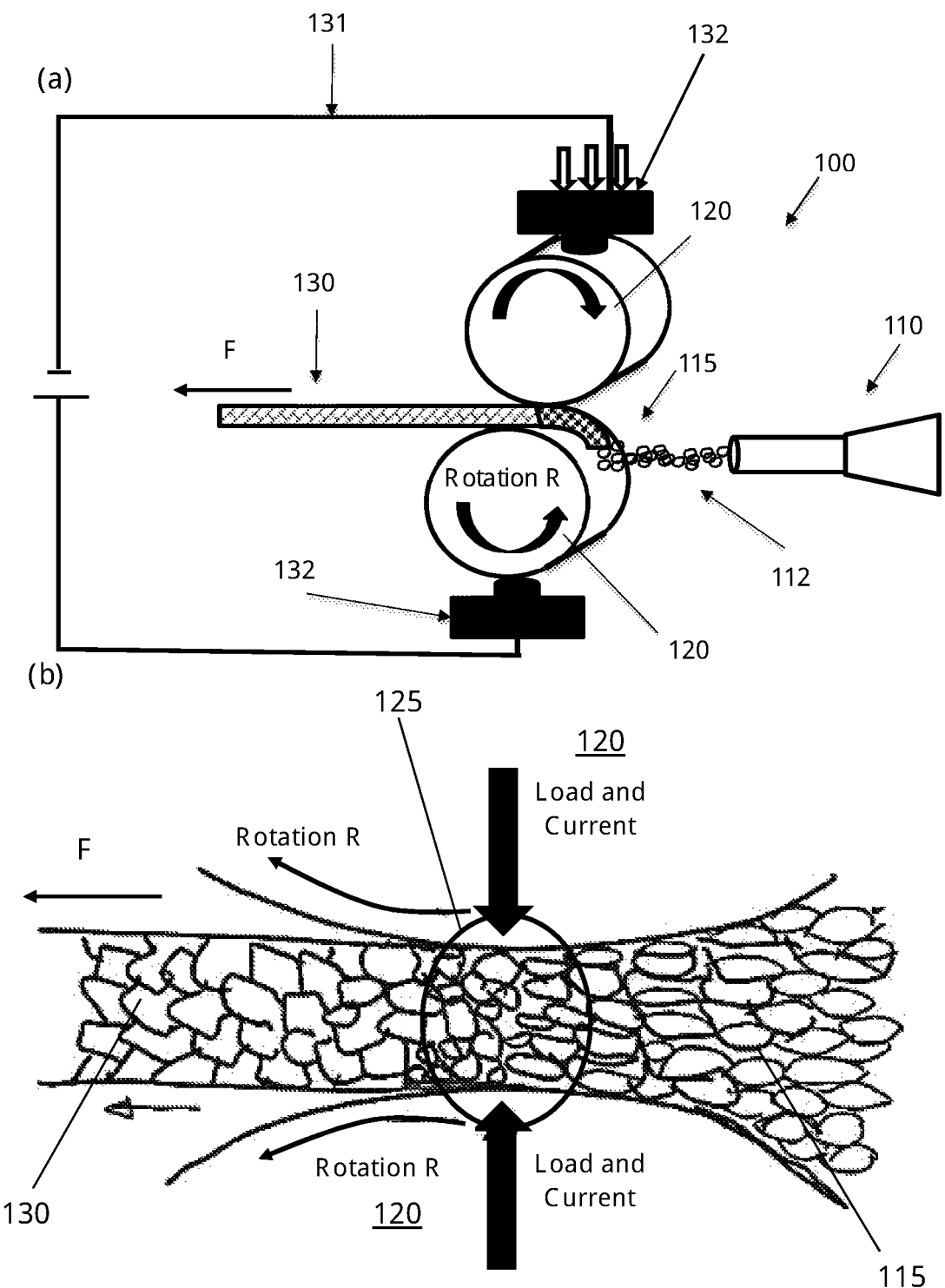
FIG. 3 provides (a) a schematic of a first embodiment of an apparatus that continuously produces a wrought structured metal strip directly from powder using cold spray melt less deposition; and (b) a schematic showing how the cold spray splat structure transforms to wrought structure using a combination of load and electrical current. The application area (or reaction zone) between rollers is zoomed in for demonstration of the way in which transformation of splat structure to wrought structure occurs.

An example of one embodiment of a process and apparatus 100 according to the present invention is illustrated in FIG. 3. This apparatus 100 continuously produces an elongate preform strip directly from powder using cold spray melt-less deposition. In that process, the cold spray apparatus 110 is configured to deposit a metallic strip as an elongate preform 115, for example a titanium strip by depositing a multitude of cold sprayed particles 112 onto one roller of the pair of roller 120 to form a consolidated particle structure to build up the preform 115 as described above. The preform 115 passes through an opposing set of rotating rollers 120 for simultaneous compressive lateral loading, deformation and heating. The rollers 120 rotate in direction R to move the preform 115 therethrough in the feed direction F (with the top and bottom rollers rotating in opposite directions). The rollers 120 engage an application area 125 of the preform 115 engaged between the rollers 120 and apply or pass an electrical current through that application area 125 to generate 'heat' therein (resistive heating etc.) while applying compressive lateral load to transform splat structure (in the preform 115) to wrought structure 130 without melting. Current is provided from current source 131, a generator, electrical supply or the like. As shown in FIG. 2(A), the compressive lateral load is applied using pneumatic load device 132, a pneumatic piston which laterally moves the rollers 120. However, it should be appreciated that other compression devices could equally be used to achieve this result. The compressive load of roller 120 is applied laterally to the application area compressed between rollers 120, and laterally to the feed direction F of the preform through the rollers 120. The application of compressive lateral load and heat (in the illustrated embodiment heat is applied using current) causes the material to heat to a local temperature above the recrystallisation temperature of the material but below the melting point of the material. The crystal structure of the material is therefore able to recrystallise, and the application of compressive lateral load also assists to compress any voids of pores inherent in the cold spray splat structure during the softening process. In FIG. 3 (*b*), the application area 125 (or reaction zone) between rollers 120 is zoomed in for demonstration of the way in which transformation of splat structure (for example as shown in FIG. 2(A)) to wrought structure (for example as shown in FIG. 2(B)) occurs. Here a structure 115 comprising cold spray splats with porosity between the splats, is subjected to lateral (or uniaxial) load and current in the application area 125 to form a dense wrought recrystallised structure 130. Nucleation and growth of new recrystallised grains occurs under load and current at or just after the application area 125.

In the illustrated embodiment, deposition of the preform 115 occurs on the surface of one roller of the pair of roller 120. However it should be appreciated that in other arrangements the preform can be deposited on other deposition surfaces, for example linear deposition of the material on a flat surface, or deposition of a starter substrate that is rotated in order to form a cylindrical bar, pipe or tube for example as described in international patent publication WO2015157816 (cylindrical preform), international patent publication WO2009109016 (hollow pipe) or international patent publication WO2011017752 (hollow pipe) the content of each of which should be understood to be incorporated into this specification by the above references.

In the illustrated embodiment the applied current heats the material of the application area through resistive heating of the material. The optimal current applied to the preform 115 is therefore material dependent. Similarly, the optimal load applied depends on the mechanical, electrical and physical properties of the formed preform 115. Those properties are dependent on the constituent material and the properties (porosity and density) of the cold spray deposited material forming the preform 115. The applied current and compressive load can therefore fall in a wide range of values depending on the material and properties of the formed preform. In embodiments, the current density of the applied current is from 500 to 2000 A/mm$^2$, preferably from 800 to 1500 A/mm$^2$, more preferably 1000 to 1100 A/mm$^2$. The voltage associated with the applied current is preferably 2 to 3 volts. In embodiments, the applied compressive load is from 10 to 100 kg/m$^2$, preferably from 20 to 60 kg/m$^2$.

Control of the load and heat (here through the application of current) are important to achieve the required structural transformation (recrystallisation) of the deposited cold spray splat structure to the wrought structure. The size of the newly formed crystals defines the final mechanical properties while avoiding the melting process. The speed that the deposited material passes through the rollers is also important as it relates to the speed that material deposits for continuous manufacture of the wrought structure.

An alternative to the application of current to generate heat is the use of conductive heating, for example using coiled wires around the load apparatus for example. However, it should be appreciated that the preferred heating technique is a rapid heating technique such as can be applied by current (resistive heating of the material), induction heating or laser heating to the application area.

Figure 3A:
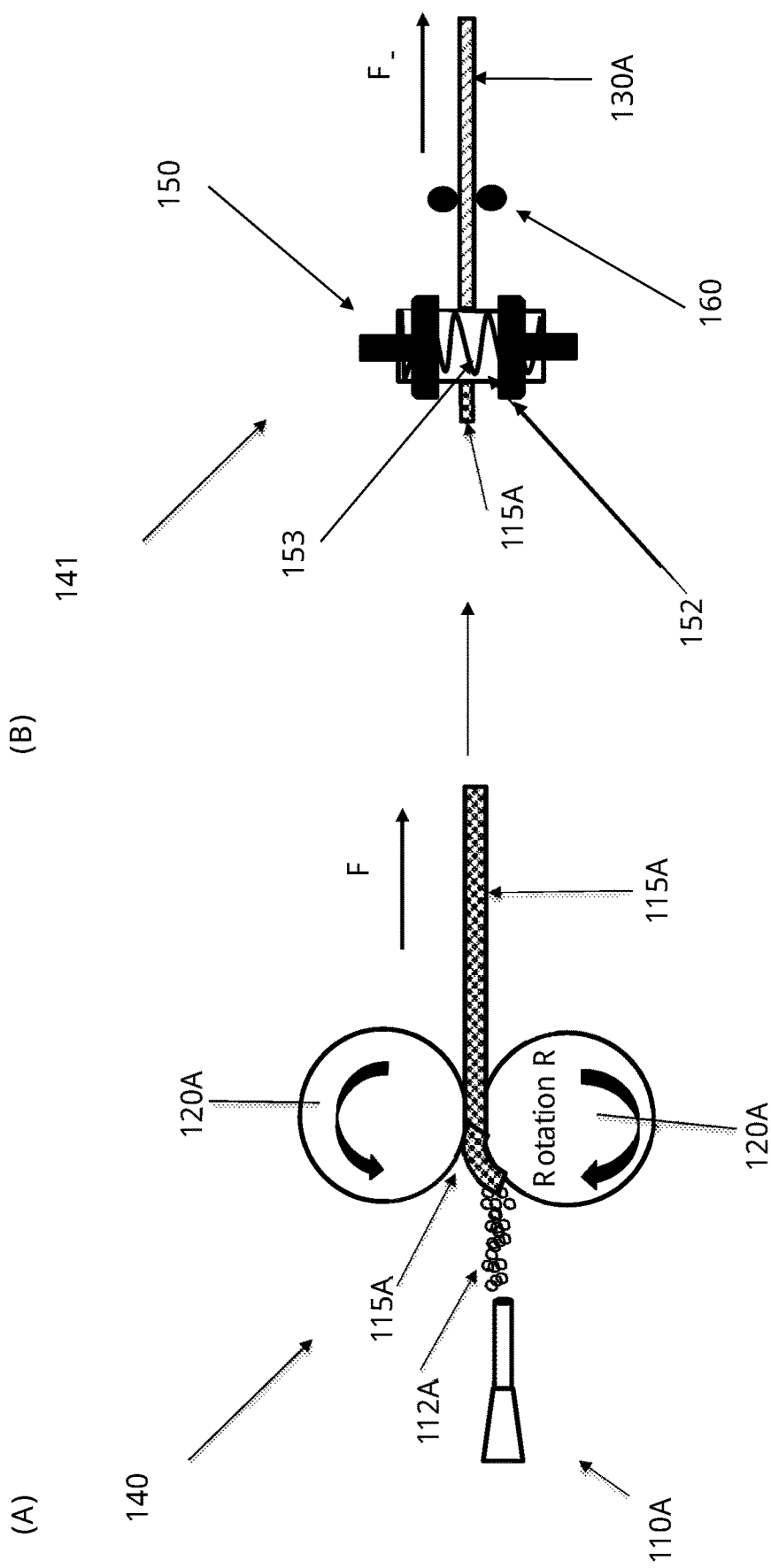
FIG. 3A provides (a) a schematic of a second embodiment of an two step apparatus that produces a wrought structured metal strip directly from powder using cold spray melt less deposition, where (A) shows that first step of forming the preform strip; and (B) shows the second step of forming the wrought material.

An example of another embodiment of a process and apparatus of the present invention 100A is illustrated in FIG. 3A. This apparatus 100A separates the process into two separate stages, being (A) Step 1—preform formation step, and (B) Step 2—Wrought material formation step. In the first step a preform 115A is formed by depositing a multitude of cold sprayed particles 112A onto one roller of the pair of roller 120A to form a consolidated particle structure to build up the preform 115A as described above. This produces an elongate preform strip directly from powder using cold spray melt-less deposition. The elongate strip can be formed on any deposit surface. In FIG. 3A, the preform 115A is deposited onto one roller of a pair of rollers 120A rotating in direction R', which is then compressed to further consolidate the preform into a strip. The preform 115A moves through the rollers 120A in feed direction F'. However, it should be appreciated that the preform 115A could be simply cold sprayed into a consolidated metal preform with no additional compression, for example titanium formed on a steel substrate. The preform 115A is then removed and fed to the step 2 at some point after formation. For titanium formed on a steel substrate this can be achieved using the difference in thermal expansion coefficient.

Again, to achieve continuous deposition of particles, the cold spray apparatus 110A preferably includes at least two powder feeders (not shown) allowing the powder feeders to be switched during operation when one feeder runs out of powder.

In the second stage, the formed preform 115A passes through a compression apparatus 150 for simultaneous compressive loading and deformation and heating. This compression apparatus 150 can comprise a press 152, but may comprise rollers similar to the first embodiment. The press engages an application area 125 (see FIG. 3) of the preform 115A and applies 'heat' therein while applying compressive load to transform splat structure (in the preform 115A) to product 130A having wrought structure without melting. The preform 115A moves through the compression apparatus 150 in feed direction F'''. The application of compressive load and current to the application area 125 (FIG. 3A) causes the material in the preform 115A to heat to a temperature above the recrystallisation temperature of the material but below the melting point of the material. The crystal structure of the material of the preform 115A is therefore able to recrystallise, and the application of compressive lateral load also assists to compress any voids of pores inherent in the cold spray splat structure of the preform 115A to form a wrought structure thereby producing a wrought material product 130A. The wrought material product 130A can then be formed into the desired product, for example wire, rod, billet or the like. Rollers 160 convey the strip through the compression device 150.

Again, the applied heat can be applied to the application area 125 using a number of suitable techniques. In embodiments, heat is applied to the application area by at least one of: current, induction heating or laser heating. In the illustrated embodiment, the heat is applied using induction heater 153. However, like the first embodiment heat may be applied using the application of an alternating or direct current to the application area.

The process of the present invention provides a number of advantages:

1. Deposition and transformation of the powder to wrought structures permits for rapid manufacturing of a broad range of products and product shapes such as milling products (i.e. rod, wire, sheet, nuts, bolts, etc.) allowing cost effective transformation of traditional industries to modern additive manufacturing plants.
2. Bulk melting of the material is eliminated. The wrought structure is manufactured directly from solid powder. This means that for some processes the final wrought structures can be produced directly from the reduced ore powder. For example, high strength, high ductility Ti wrought structure can be produced from Ti sponge crushed as powder without costly melting process that occurs under controlled atmosphere.
3. Continuous manufacturing of the wrought structures (i.e. mill products such as rods, billets, wires, plates, strips, nut, bolts, sheets etc) is possible through continuous powder feed and rapid (in seconds) transformation of splat structure to recrystallised wrought structure. This is important for two reasons. First, in current additive manufacturing processes such as Electron Beam Melting (EBM) and Laser Assisted Melting (LAM) the melting process leads to formation of cast structure that is generally inferior to wrought structure in terms of mechanical properties. Second, current post processing of splat structures such as HIPing that operate under high temperature in a high pressure chamber are highly time consuming batch processes and are energy intensive and therefore affect the cost competitiveness of that technology.
4. The melt-less process of the present invention allows for oxygen sensitive materials such as Ti and Tantalum to be produced in wrought form rapidly and at significantly lower cost opening a new market for these products that traditionally considered expensive. The same applies for materials that are sensitive to phase transformation and solidification process.
5. Avoiding melting process all together leads to significant decrease in carbon foot print for every wrought material currently produced globally through adoption of this invention.
6. Creation of new wrought materials that could be only sourced from this invention through mixing different powder materials to achieve unique physical and mechanical properties such as application in superconductors and semiconductors.
7. The present invention can also be used to respond to the demand from industry to recycle large particle size powders using cold spray. Other additive manufacturing industries such as EBM require a narrow particle size range creating a large surplus for the rest of the powder produced. This large surplus must be dumped in the land field or melted at very high cost. The present invention can be used to recycle and transform this excessive powder to additively manufactured wrought products ready to be used in the market.
8. The application of material shapes and configurations, like long elongated pipes, sheets and wires which are impractical to be processed into wrought structures from additive manufacturing processes using the HIP processes.

EXAMPLES

The description of embodiments of the invention in the following examples is in the context of producing a flat strip titanium alloy preform from titanium alloy particles. However, it will be appreciated that the invention enables production of preform of various metals and alloys thereof and the description should not be interpreted as limiting the embodiments to producing titanium alloy preform and wrought product only.

Example 1—Cold Spray Deposition of Strip

To demonstrate transformation of cold spray splat structure to (recrystallised) wrought structure a CGT Kinetic 4000 cold spray system was used having the following parameters:
   Cold spray equipment: CGT Kinetiks 4000 system
   Robot arm for controlling movement of cold spray gun: ABB IRB2600
   Number of supersonic nozzles: one
   Stand-off: 30 mm
   Spray angle: Normal to the surface at all times
   Gas: nitrogen
   Gas stagnation temperature: 750° C.
   Gas stagnation pressure: 25 bar (2.5 MPa)
   Powder feed rate: 21.4 g/min
   Robot traverse speed: 5 mm/s A preform strip was additively manufactured using a Commercial Purity Titanium (CP Ti) powder with 26 µm average particle size. Ti powder had irregular shape. The strip dimensions were 1.5 mm Height×4 mm Width×150 mm Length.

It is noted that the cold spray system in this experiment was not set to achieve high density structure but rather to examine the effectiveness of the current invention to eliminate or reduce porosity. Complete elimination of porosity in as sprayed structure requires the use of an expensive powder with narrow particle size range as well as higher energy (pressure and temperature) from cold spray system.

A commercially available nozzle with dimensions in Table 1 was used to deposit CP Ti on the side of a stainless steel plate. The deposited CP Ti strip was separated from the stainless steel substrate after deposition.

TABLE 1

Dimensions of the cold spray nozzle

| Configuration | Dimensions, mm |
|---|---|
| Convergent section length | 51.2 |
| Throat diameter | 2.6 |
| Divergent section length | 71.3 |
| Exit diameter | 8.5 |

In-situ Transformation of the Strip under High Current and Load

The CP Ti strip was exposed simultaneously to high electrical current (3000 amps) and load (25 kg) using a modified spot welder. A control system was added to the spot welder to allow for high current to pass through the sample for a desired time. This modification was necessary due to the fact that spot welders are designed to melt the material locally to join parts. In this invention we avoid melting and use the current to precisely heat the material to desired temperature for recrystallisation reaction to initiate and proceed. The current (3000 amps) was applied to a spot on the CP Ti strip at different holding times. At 2 seconds total holding time that was achieved through 10 pulses with 0.2 seconds duration of current and 1 second stop a complete recrystallisation and densification of the CP Ti structure was achieved as shown in FIGS. 4 to 9.

Creation of Wrought Recrystallised Structure from Cold Spray Splats

Figure 4A:
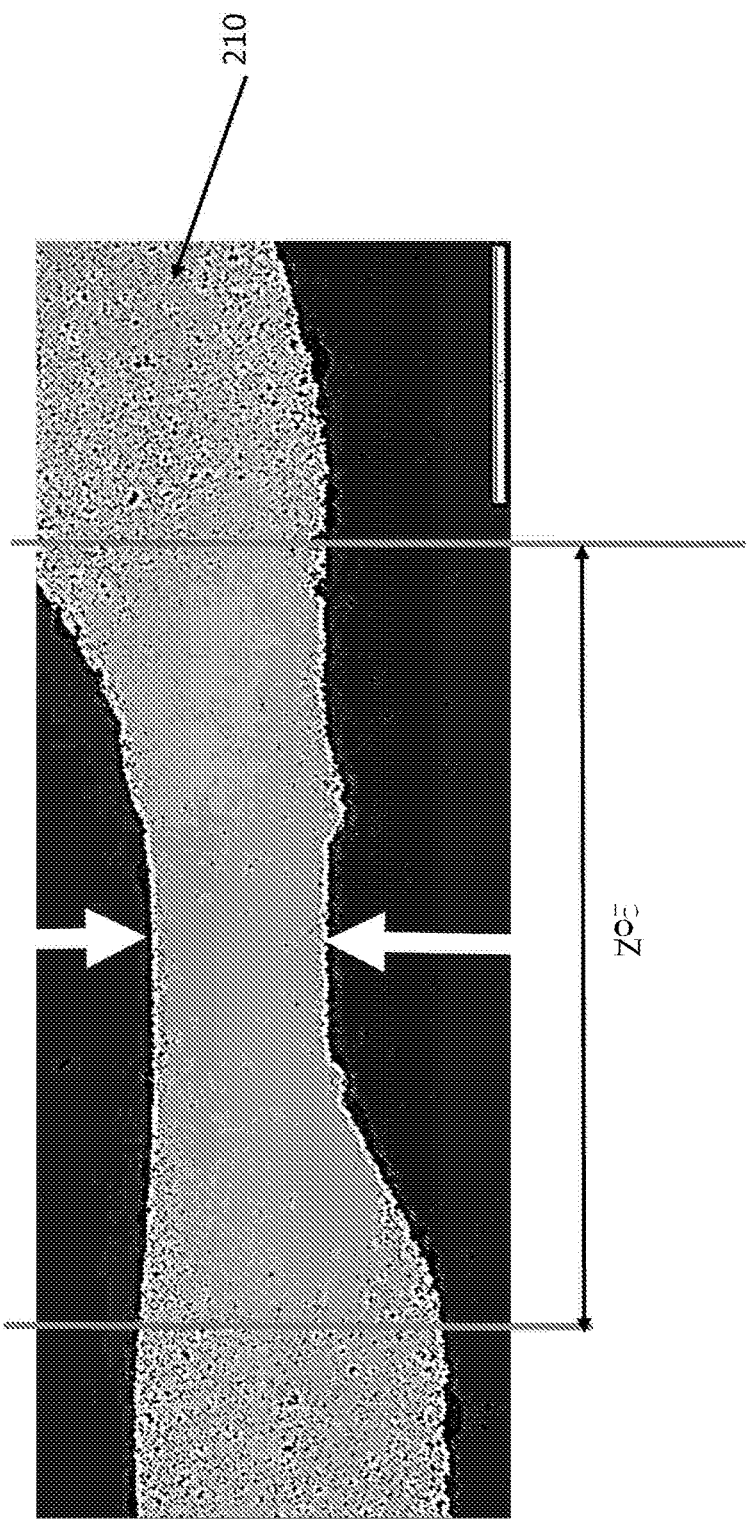
FIG. 4(a) illustrates the microstructure of cold spray Ti strip exposed to high current and load that was polished before chemical etching.
Figure 4B:
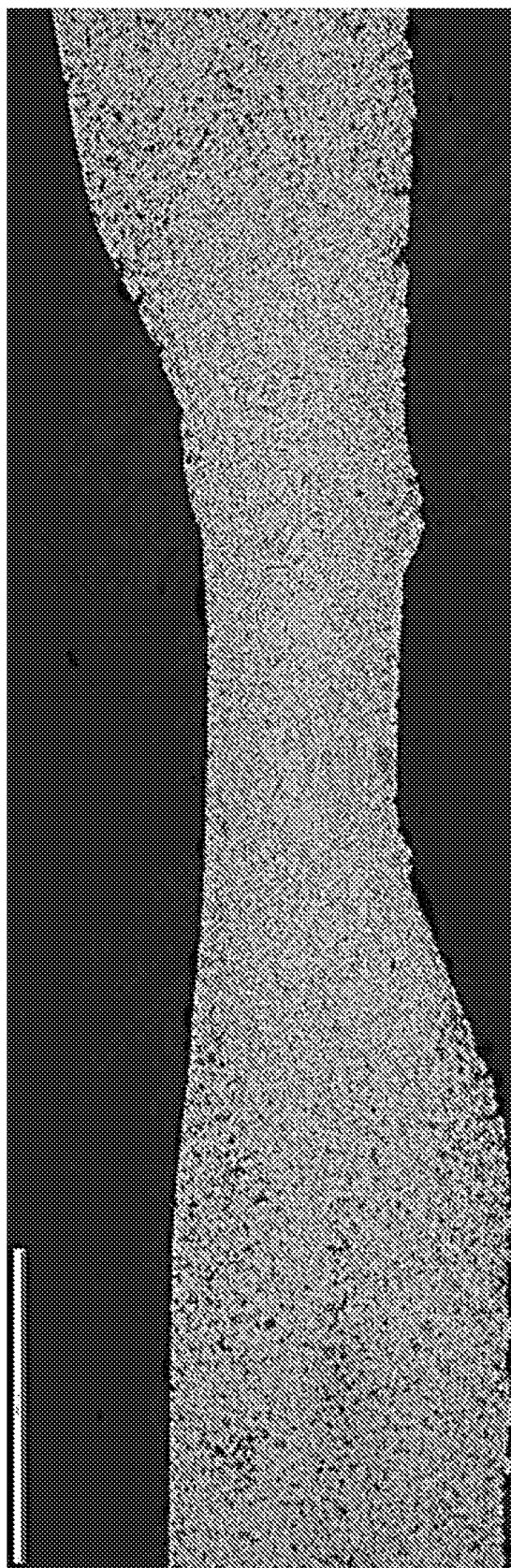
FIG. 4(b) shows Microstructure of cold spray Ti strip exposed to high current and load that is polished and etched to reveal recrystallised and densified zone.

FIG. 4(*a*) shows the polished microstructure of the cold spray CP titanium that was exposed to high current and load at arrow 200. The microstructure shows a reaction zone 205 in which high density CP Ti is created from exposure to high current and load at point 200 on as sprayed cold spray CP Ti 210. The As sprayed CP Ti 201 has a microstructure with porosity.

A significant decrease in porosity was observed in the application area (or reaction zone 205) confirming densification of the structure that contributes to improved ductility and enhanced mechanical properties.

Specimen was etched as shown in FIG. 4(*b*) to reveal transformation of cold spray splat structure to recrystallised wrought structure. Presence of needle like constituents within the equiaxed grains in FIG. 4(*b*) confirm that during the process CP Ti transformed from splat structure to wrought structure.

Figure 5:
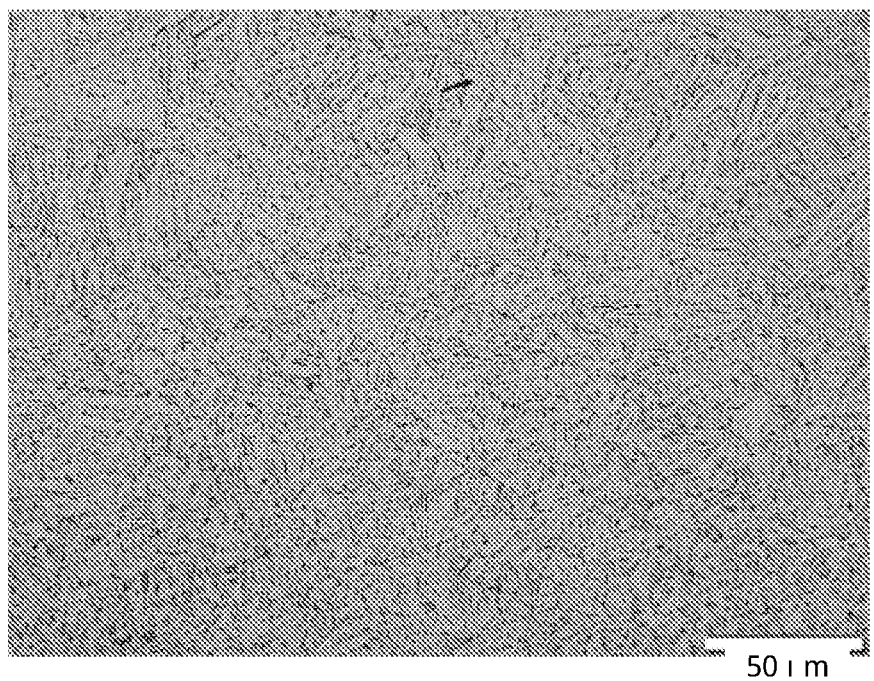
FIG. 5 illustrates the microstructure corresponding to densified zone in FIG. 4(b) that is polished and etched.
Figure 6:
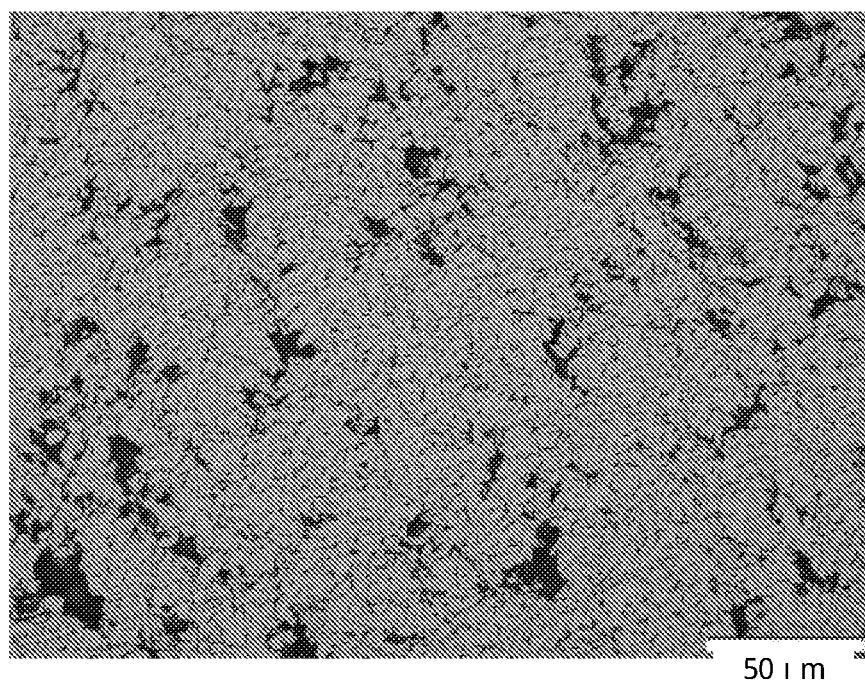
FIG. 6 illustrates the microstructure of as cold sprayed Ti-6Al-4V alloy polished and etched.

FIG. 5 presents the application area (or reaction zone) of the FIG. 4(*b*) at higher magnifications with FIG. 6 showing the porous as sprayed splat structure of CP Ti.

Figure 7:
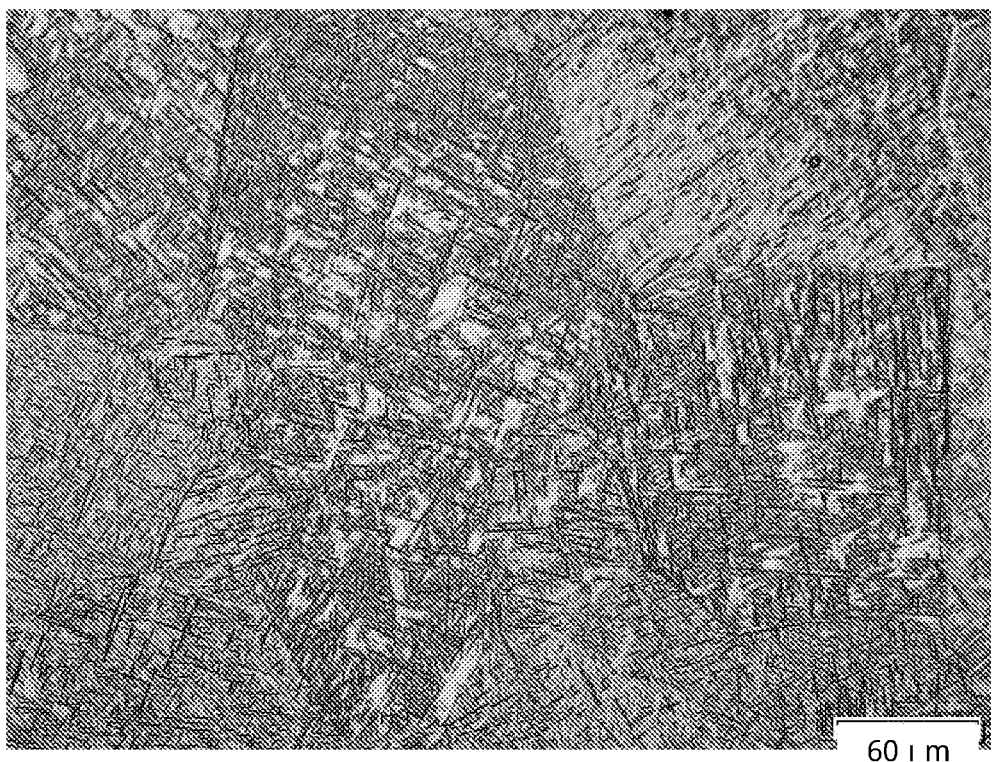
FIG. 7 provides a high magnification microstructure of processed (wroughted) cold spray Ti-6Al-4V alloy polished and etched.
Figure 8:
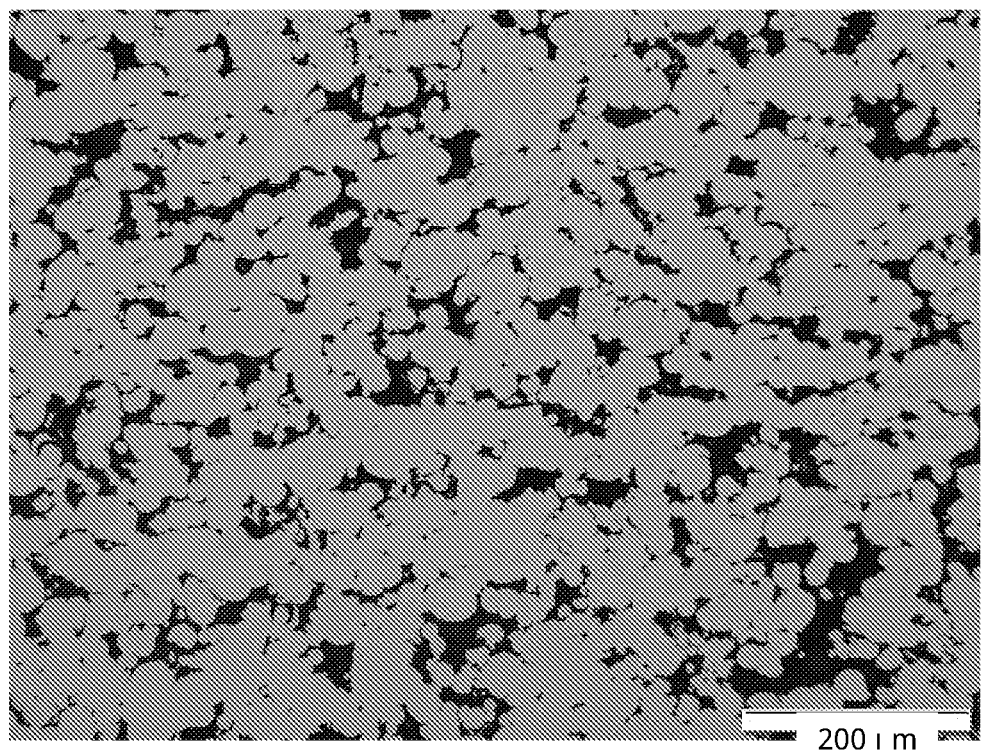
FIG. 8 illustrates the microstructure of as cold sprayed Ti strip polished and etched.

The recrystallised Ti-6Al-4V structure with 60 micron prior Beta grains in FIG. 7 was achieved from the as sprayed porous structure in FIG. 8. FIGS. 7 and 8 therefore show that the current and load applied to the CP Ti strip produces a similar densified and recrystallised wrought structure for a widely used Ti-6Al-4V alloy.

Example 2

Three further experimental runs were performed using the methodology detailed in Example 1 following the parameters listed below:

Run 2: Ti64 grains created from cold spray structure, 3000 amps applied for 1 sec to sample with original height of 4.65 mm that led to reduced height to 2.9 mm presenting 38% reduction.

Run 3: Ti64 grains created from cold spray structure, 3000 amps applied for 0.8 sec to sample with original height of 4.65 mm that led to reduced height to 2.8 mm presenting 40% reduction.

Run 4: Ti64 grains created from cold spray structure, 3000 amps applied for 5 sec to sample with original height of 4.65 mm that led to reduced height to 3.65 mm presenting 20% reduction.

Figure 9:
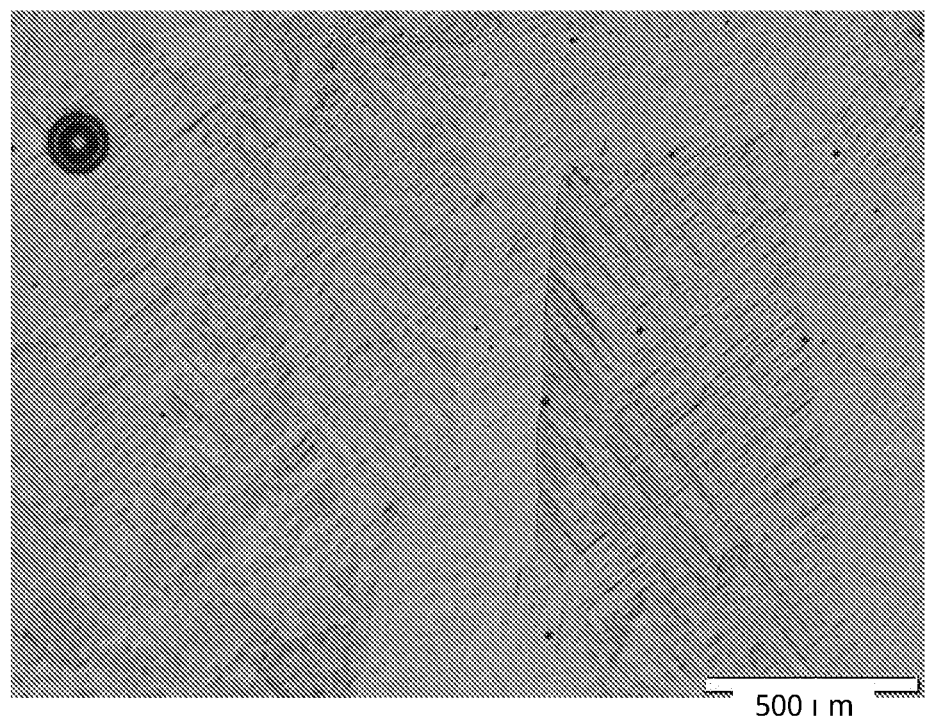
FIG. 9 illustrates the microstructure (wrought) of cold spray Ti strip produced in run 2 that has been exposed to high current and load that is polished and etched to reveal recrystallised and densified zone.
Figure 10:
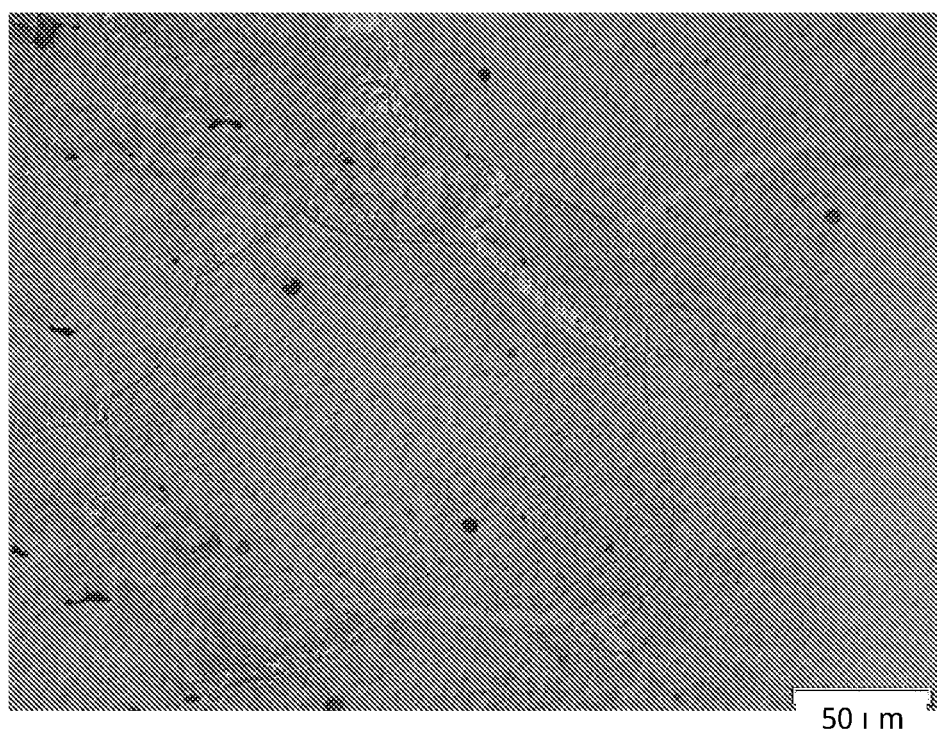
FIG. 10 illustrates the microstructure (wrought) of cold spray Ti strip produced in run 3 that has been exposed to high current and load that is polished and etched to reveal recrystallised and densified zone.
Figure 11:
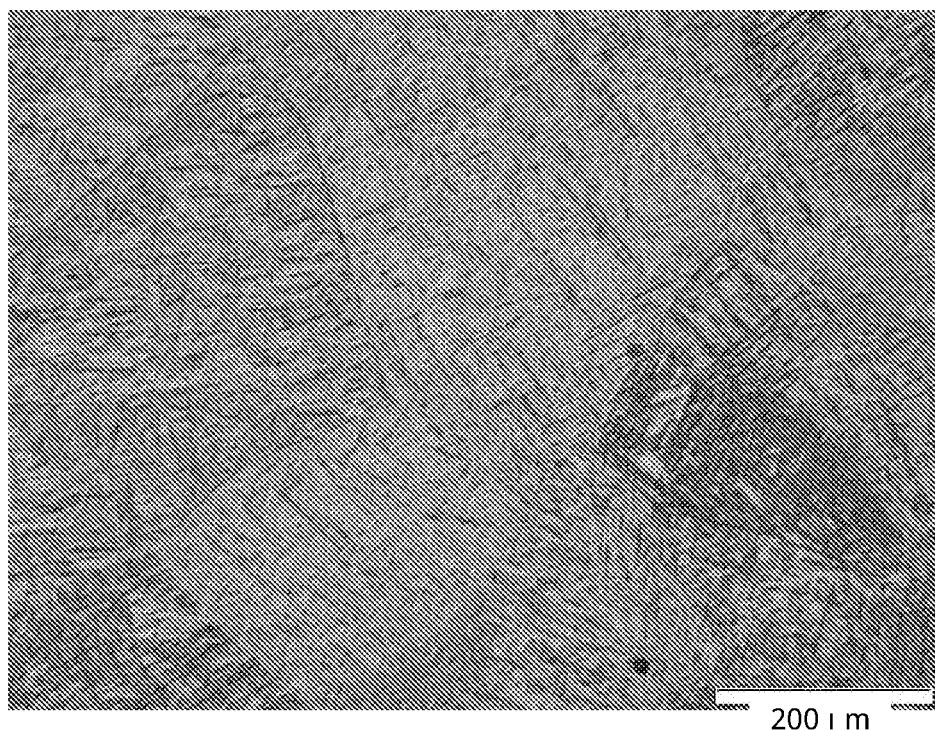
FIG. 11 illustrates the microstructure (wrought) of cold spray Ti strip produced in run 4 that has been exposed to high current and load that is polished and etched to reveal recrystallised and densified zone.

The etched SEM image of produced sample for runs 2, 3 and 4 are shown in FIGS. 9 to 11. The resulting microstructure of runs 2 and 3 each show very small pores are also present. The resulting microstructure of run 4 shows that large grains are formed and are presented.

It should be appreciated the process described in Example 1 can be applied to any metal that can be deposited using cold spray such as Al, Cu, Zinc, Ni, Ti, Ta, Steel, as well as metal matrix composites such as mixture of metal with ceramics like carbides and superconductors.

Figure 12:
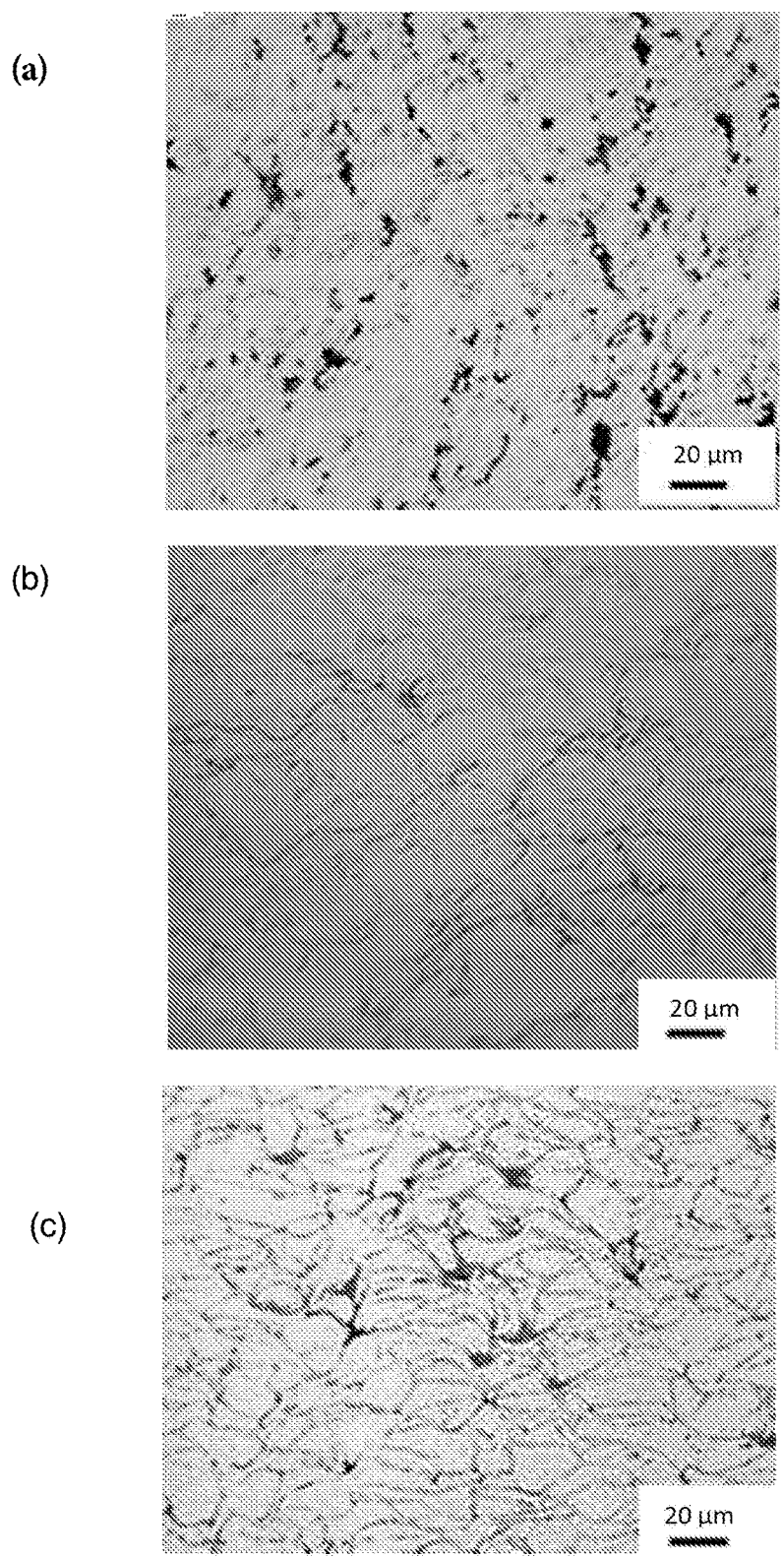
FIG. 12 provides a SEM micrograph showing (A) the microstructure of cold spray that is formed from accumulation of cold sprayed consolidated particle Ni splats (not yet wroughted); (B) the etched microstructure of cold spray that is formed from accumulation of cold sprayed consolidated particle Cu splats (not yet wroughted); and (C) the etched microstructure of cold spray that is formed from accumulation of cold sprayed consolidated particle Al splats (not yet wroughted).

By way of illustration, FIG. 12 provides SEM micrographs showing (A) the microstructure of cold spray that is formed from accumulation of cold sprayed consolidated particle Ni splats (not etched, not subject yet to heat and compression); (B) the etched microstructure of cold spray that is formed from accumulation of cold sprayed consolidated particle Cu splats, not subject yet to heat and compression; and (C) the etched microstructure of cold spray that is formed from accumulation of cold sprayed consolidated particle Al splats, not subject yet to heat and compression.

Wrought material can be formed from each of the cold sprayed Ni, Cu and Al consolidated particles as described in Example 1. By subjecting the preforms of these materials of FIG. 12, to high current and lateral compressive load using a similar technique to that described in Example 1 a similar complete recrystallisation and densification of the cold sprayed structure, similar to the CP Ti described in Example 1 would be achieved. The final wrought microstructure would resemble the transformed Ti structures shown in FIGS. 5 and 7, i.e. is an 'equiaxed recrystallised' structure formed from cold spray lentil like solar structure shown in FIG. 12.

Whilst the examples and accompanying description only show flat strip preforms, it should be appreciated, that various configurations of preforms could be produced by controlling movement of the spray nozzle and/or material deposition surface. Similarly, it should be appreciated that a void or hollow could also be introduced into the preform by introducing a no-deposit area or zone in the spray pattern of the cold spray applicator, where no material is deposited.

Similarly, whilst the examples and accompanying description only show preforms having a substantially constant cross-section, it should be appreciated that the preform can also be formed with variable or non-constant diameter such as a cone shapes, cone section, or shapes with a step or taper (large diameter to smaller diameter).

Similarly, with the examples and accompanying description only exemplifies the use of current to heat the samples, it should be appreciated that other types of heat sources, particularly rapid heating sources can be used to heat the selected area of the sample with the simultaneous application of load. Examples include induction heating or laser heating.

Whilst not detailed, it should be appreciated that the above materials could be undergo:

Microstructurel analysis using metallography and optical microscopy to compare the transformed recrystallised structures with as sprayed structure particularly in respect to pore distribution; and Measurement of mechanical properties by means of microhardness to compare as sprayed and recrystallised materials.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. An apparatus for producing a product having a wrought structure from a cold spray deposition preform having a consolidated particle structure, comprising:

a cold spray deposition apparatus configured to form the cold spray deposition preform on a deposition surface, and a compressive load applicator configured to simultaneously apply heat and a compressive load to an application area of the cold spray deposition preform that was formed from the cold spray deposition apparatus, wherein the compressive load applicator applies the compressive load laterally to the application area in a direction that is substantially perpendicular to the tangential plane of the application area or point, and wherein, the compressive load applicator is configured to apply the compressive load and heat to raise the temperature of the material of the preform in the application area to between the recrystallisation temperature and the melting point of the material.

2. An apparatus according to claim 1, wherein the heat is applied by a rapid heating technique selected from at least one of: current, induction heating or laser heating.

3. An apparatus according to claim 1, wherein the heat is applied using current comprising at least one of alternating current or pulsed direct current.

4. An apparatus according to claim 1, wherein the compressive load applicator is configured to provide a current having:

current density of the applied current is from 500 to 2000 A/mm$^2$.

5. An apparatus according to claim 1, wherein the compressive load applicator can apply a load of from 10 to 100 kg/m$^2$.

6. An apparatus according to claim 1, wherein the compressive load applicator comprises at least one roller configured to compressively engage the preform.

7. An apparatus according to claim 6, further comprising at least two rollers, between which the preform is fed and compressed.

8. An apparatus according to claim 6, wherein at least one roller is configured to apply heat.

9. An apparatus according to claim 6, wherein at least a portion of the rollers comprise a conductive material.

10. An apparatus according to claim 6, wherein at least one roller includes a cooling system or arrangement.

11. An apparatus according to claim 1, wherein the preform is formed on the surface of at least one of the rollers prior to being compressed by said rollers.

12. An apparatus according to claim 1, wherein the preform is formed on or about a feed axis along which the preform moves.

* * * * *